United States Patent
Kaufthal et al.

(10) Patent No.: US 10,402,034 B2
(45) Date of Patent: Sep. 3, 2019

(54) ADAPTIVE USER INTERFACE PANE MANAGER

(71) Applicant: MICROSOFT TECHNOLOGY LICENSING, LLC, Redmond, WA (US)

(72) Inventors: Jonathan S. Kaufthal, Seattle, WA (US); Travis Spomer, Redmond, WA (US); Ryan Sloan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 17 days.

(21) Appl. No.: 14/453,445

(22) Filed: Aug. 6, 2014

(65) Prior Publication Data

US 2015/0286344 A1    Oct. 8, 2015

Related U.S. Application Data

(60) Provisional application No. 61/974,377, filed on Apr. 2, 2014.

(51) Int. Cl.
G06F 3/0481    (2013.01)
G06F 3/0484    (2013.01)
G06F 9/451    (2018.01)

(52) U.S. Cl.
CPC .......... *G06F 3/0481* (2013.01); *G06F 3/0484* (2013.01); *G06F 9/451* (2018.02); *G06F 2203/04803* (2013.01)

(58) Field of Classification Search
CPC .... G06F 3/0481; G06F 3/0482; G06F 3/0484; G06F 9/4443
See application file for complete search history.

(56) References Cited

U.S. PATENT DOCUMENTS 5,060,170 A * 10/1991 Bourgeois ................ G09G 5/14
  715/788
5,142,618 A *  8/1992 Fujiwara ................ G06F 17/21
  715/210

(Continued)

FOREIGN PATENT DOCUMENTS

CN    101606124 A    12/2009
CN    102118322 A     7/2011

(Continued)

OTHER PUBLICATIONS

"International Search Report and Written Opinion Issued in PCT Patent Application No. PCT/US2015/022894", dated Jun. 25, 2015, 10 Pages.

(Continued)

*Primary Examiner* — Jung-Mu T Chuang
(74) *Attorney, Agent, or Firm* — Merchant & Gould P.C.

(57) ABSTRACT

Embodiments of a system for automatically managing panes in relation to the application canvas in a user interface. The system includes a pane manager that works in conjunction with applications to provide access to panes while keeping a minimum amount of user content visible. The system allows an application to define a protected canvas size. When a pane is needed, the system determines if sufficient room for the pane exists or can be created by dismissing another pane. If so, the pane is added. If not, the pane may be displayed in a temporary manner. The system also responds to changes in the user interface size. If the user interface size decreases to a point where sufficient room for existing panes is no longer available, one or more of the existing panes are dismissed.

12 Claims, 15 Drawing Sheets

(56) References Cited

U.S. PATENT DOCUMENTS

| | | | | |
|---|---|---|---|---|
| 5,390,295 | A * | 2/1995 | Bates | G06F 3/0481 714/E11.188 |
| 5,408,602 | A * | 4/1995 | Giokas | G06F 9/451 715/733 |
| 5,712,995 | A * | 1/1998 | Cohn | G06F 3/0481 715/792 |
| 5,726,669 | A * | 3/1998 | Obata | G06F 3/0481 345/2.2 |
| 5,757,371 | A | 5/1998 | Oran et al. | |
| 5,825,360 | A * | 10/1998 | Odam | G06F 3/0481 715/807 |
| 5,999,177 | A * | 12/1999 | Martinez | G06F 3/0481 715/235 |
| 6,356,279 | B1 * | 3/2002 | Halstead, Jr. | G06F 9/4443 345/619 |
| 6,414,698 | B1 * | 7/2002 | Lovell | G06F 9/4443 345/472 |
| 6,603,493 | B1 * | 8/2003 | Lovell | G06F 9/4443 345/660 |
| 7,080,326 | B2 * | 7/2006 | Molander | G06F 3/0481 715/788 |
| 7,496,844 | B2 * | 2/2009 | Andrew | G06F 9/4443 715/252 |
| 7,577,922 | B2 * | 8/2009 | Mann | G06F 3/0481 715/811 |
| 7,620,908 | B2 | 11/2009 | Klevenz et al. | |
| 7,681,143 | B2 * | 3/2010 | Lindsay | G06F 3/0481 715/788 |
| 7,692,658 | B2 * | 4/2010 | Moore | G06T 11/60 345/473 |
| 7,730,422 | B2 | 6/2010 | Russo | |
| 7,873,622 | B1 * | 1/2011 | Karls | G06F 17/30864 707/707 |
| 8,245,143 | B2 | 8/2012 | Yach et al. | |
| 8,341,143 | B1 * | 12/2012 | Karls | G06F 17/30991 707/708 |
| 8,381,127 | B2 * | 2/2013 | Singh | G06F 3/0481 715/790 |
| 8,464,177 | B2 * | 6/2013 | Ben-Yoseph | G06F 3/0481 715/792 |
| 8,484,574 | B2 * | 7/2013 | Burroughs | G06F 17/30873 715/764 |
| 8,490,014 | B2 * | 7/2013 | Colussi | G06F 3/0483 715/781 |
| 8,527,907 | B2 | 9/2013 | Goshey | |
| 8,543,904 | B1 * | 9/2013 | Karls | H01L 27/222 707/704 |
| 8,635,553 | B2 * | 1/2014 | Dhawan | G06F 3/0484 715/788 |
| 8,705,119 | B2 * | 4/2014 | Bonikowski | B41J 2/0057 358/1.1 |
| 8,707,199 | B2 | 4/2014 | Smith | |
| 8,736,561 | B2 | 5/2014 | Anzures et al. | |
| 8,930,845 | B2 | 1/2015 | Ma et al. | |
| 9,026,928 | B2 * | 5/2015 | Ferry | G06F 8/38 715/765 |
| 9,223,591 | B2 * | 12/2015 | Hayes | G06F 9/4443 |
| 9,411,487 | B2 * | 8/2016 | Ording | G06F 3/0481 |
| 9,513,783 | B1 * | 12/2016 | Vaidya | G06F 9/4443 |
| 10,042,655 | B2 | 8/2018 | Kaufthal et al. | |
| 2002/0089546 | A1 * | 7/2002 | Kanevsky | G06F 3/0481 715/800 |
| 2002/0191028 | A1 * | 12/2002 | Senechalle | G09G 5/14 715/800 |
| 2003/0025737 | A1 * | 2/2003 | Breinberg | G06F 8/38 715/801 |
| 2003/0137539 | A1 | 7/2003 | Dees | |
| 2004/0189710 | A1 * | 9/2004 | Goulden | G06Q 30/02 715/790 |
| 2004/0212640 | A1 | 10/2004 | Mann et al. | |
| 2004/0268212 | A1 | 12/2004 | Malik | |
| 2004/0268269 | A1 * | 12/2004 | Breinberg | G06F 8/38 715/851 |
| 2005/0005236 | A1 * | 1/2005 | Brown | G06F 3/0485 715/246 |
| 2005/0114788 | A1 | 5/2005 | Fabritius | |
| 2005/0183017 | A1 | 8/2005 | Cain | |
| 2005/0188174 | A1 * | 8/2005 | Guzak | G06F 17/30126 711/203 |
| 2006/0236264 | A1 * | 10/2006 | Cain | G06F 3/0481 715/788 |
| 2007/0016875 | A1 * | 1/2007 | Santos-Gomez | G06F 3/0481 715/798 |
| 2007/0022389 | A1 * | 1/2007 | Ording | G06F 3/0481 715/790 |
| 2007/0168859 | A1 * | 7/2007 | Fortes | G06F 17/211 715/700 |
| 2007/0180401 | A1 * | 8/2007 | Singh | G06F 3/0481 715/794 |
| 2007/0250788 | A1 * | 10/2007 | Rigolet | G06F 3/0481 715/788 |
| 2007/0288431 | A1 * | 12/2007 | Reitter | G06F 17/2745 |
| 2008/0052637 | A1 | 2/2008 | Ben-Yoseph et al. | |
| 2008/0094368 | A1 | 4/2008 | Ording et al. | |
| 2008/0120569 | A1 * | 5/2008 | Mann | G06F 3/0481 715/792 |
| 2008/0204417 | A1 | 8/2008 | Pierce et al. | |
| 2009/0171920 | A1 * | 7/2009 | Wade | G06F 17/30864 |
| 2009/0196414 | A1 * | 8/2009 | Mittal | H04L 9/06 380/28 |
| 2009/0300542 | A1 | 12/2009 | Duarte | |
| 2010/0019989 | A1 * | 1/2010 | Odagawa | G06F 3/147 345/1.1 |
| 2010/0046013 | A1 * | 2/2010 | Bonikowski | B41J 2/0057 358/1.9 |
| 2010/0058220 | A1 * | 3/2010 | Carpenter | G06Q 30/02 715/772 |
| 2010/0070876 | A1 | 3/2010 | Jain et al. | |
| 2010/0138767 | A1 | 6/2010 | Wang et al. | |
| 2010/0229110 | A1 | 9/2010 | Rockey et al. | |
| 2011/0252304 | A1 | 10/2011 | Lemonik et al. | |
| 2011/0260970 | A1 | 10/2011 | Kuo et al. | |
| 2012/0001914 | A1 | 1/2012 | Pan et al. | |
| 2012/0081317 | A1 * | 4/2012 | Sirpal | G06F 1/1616 345/173 |
| 2012/0096344 | A1 | 4/2012 | Ho et al. | |
| 2012/0166989 | A1 * | 6/2012 | Brown | G06F 3/0486 715/768 |
| 2012/0200586 | A1 * | 8/2012 | Lima | G06F 9/4443 345/582 |
| 2013/0014050 | A1 | 1/2013 | Queru | |
| 2013/0019183 | A1 | 1/2013 | Reeves et al. | |
| 2013/0047118 | A1 * | 2/2013 | Hooper | G06F 3/0481 715/790 |
| 2013/0125041 | A1 | 5/2013 | Doan | |
| 2013/0125050 | A1 * | 5/2013 | Goshey | G06F 3/048 715/800 |
| 2013/0132885 | A1 * | 5/2013 | Maynard | G06F 3/04842 715/777 |
| 2013/0151996 | A1 | 6/2013 | Nario et al. | |
| 2013/0159941 | A1 * | 6/2013 | Langlois | G06F 3/017 715/863 |
| 2014/0033118 | A1 * | 1/2014 | Baird | G06F 3/0481 715/800 |
| 2014/0040819 | A1 * | 2/2014 | Duffy | G06F 9/4443 715/789 |
| 2014/0068505 | A1 * | 3/2014 | Hayes | G06F 9/4443 715/800 |
| 2014/0168277 | A1 * | 6/2014 | Ashley | G06F 3/1446 345/672 |
| 2014/0258924 | A1 | 9/2014 | Sekino | |
| 2014/0282232 | A1 | 9/2014 | Oh et al. | |
| 2014/0344750 | A1 * | 11/2014 | Takahashi | G06F 3/14 715/790 |
| 2015/0212723 | A1 | 7/2015 | Lim et al. | |
| 2016/0028875 | A1 | 1/2016 | Brown | |
| 2016/0085387 | A1 * | 3/2016 | Hayes | G06F 9/4443 715/789 |

(56) References Cited

U.S. PATENT DOCUMENTS

| | | | |
|---|---|---|---|
| 2016/0170622 A1* | 6/2016 | Ladd | G06F 8/70 |
| | | | 715/771 |
| 2016/0209987 A1 | 7/2016 | Kaufthal et al. | |
| 2016/0209994 A1 | 7/2016 | Kaufthal et al. | |
| 2019/0155456 A1 | 5/2019 | Kaufthal et al. | |

FOREIGN PATENT DOCUMENTS

| | | |
|---|---|---|
| CN | 102929478 A | 2/2013 |
| CN | 103324435 A | 9/2013 |
| EP | 0820002 A1 | 1/1998 |
| EP | 955580 A1 | 11/1999 |
| JP | 2004501469 A | 1/2004 |
| JP | 2005004396 A | 1/2005 |
| JP | 2008542873 A | 11/2008 |
| JP | 2012008721 A | 1/2012 |
| JP | 2013218675 A | 10/2013 |
| JP | 2014505927 A | 3/2014 |
| RU | 2336553 C2 | 10/2008 |
| RU | 2493581 C2 | 9/2013 |
| WO | 01/09834 A1 | 2/2001 |
| WO | 02082418 A2 | 10/2002 |
| WO | 2006030002 A1 | 3/2006 |
| WO | 2008030879 A2 | 3/2008 |

OTHER PUBLICATIONS

Amir Khella et al: "Pocket PhotoMesa: A Zoomable Image Browser for PDAs", International Conference on Mobile and Ubiquitous Multimedia, ACM, US, Oct. 29, 2004 (Oct. 29, 2004), pp. 1-6, XP002462595.
API Guides, App Manifest I <activity> I Android Developers, Published on: Jul. 8, 2012 Available at: http://developer.android.com/guide/topics/manifest/activity-element.html.
"API Guides", Best Practices I Supporting Multiple Screens I Android Developers, Published on: Jul. 8, 2012 Available at: http://developer.android.com/guide/practices/screens_support.html.
Qt Project, Published on: Jan. 27, 2015 Available at: http://qt-project.org/doc/qt-4.8/widgets-orientation.html.
Create Multiple Panes in a Mobile Application, Published on: Jan. 19, 2012 Available at: http://help.adobe.com/en_US/flex/mobileapps/WSa367498dc1175407-5e4576591324aa78a9f-8000.html.
Echessa, Joyce, "Building Adaptive User Interfaces for iOS 8", Published on: Nov. 6, 2014 Available at: http://www.sitepoint.com/building-adaptive-user-interfaces-ios-8/.
Holzinger, at el., "Making Apps Useable on Multiple Different Mobile Platforms: On Interoperability for Business Application Development on Smartphones", In Proceedings of International Cross-Domain Conference and Workshop on Availability, Reliability, and Security, Aug. 20, 2012, 3 pages.
Itzkovitch. Avi, "Designing for Device Orientation: From Portrait to Landscape", Published on: Aug. 10, 2012 available at: http://www.smashingmagazine.com/2012/08/1 Ofdesigning-device-orientation-portrait-landscape/.
Lars Erik Holmquist: "The Zoom Browser Showing Simultaneous Detail and Overview in Large Documents", Internet Citation, 1998, XP002462982, Retrieved from the Internet: URL:http.//www.hb.se/bhs/ith/3-98/leh.htm [retrieved on Dec. 17, 2007].
LG G2 Review: Beautiful Monster, Published on: Sep. 7, 2013 Available at: http://www.gsmarena.com/lg_g2-review-982p7.php.
Microsoft Office 2010, Retrieved at <<https://en.wikipedia.org/w/index.php?title=Microsoft_Office_2010&oldid=601512204>> Mar. 27, 2014, 12 Pages.

Mitrovic, et al., "Adaptive User Interfaces based on Mobile Agents: Monitoring the Behavior of users in a Wireless Environment", In First Symposium on Ubiquitous Computing and Ambient Intelligence, Sep. 2005, 8 pages.
Natasa Milic-Frayling et al: "SmartView: Enhanced Document Viewer for Mobile Devices", Internet Citation, Nov. 15, 2002 (Nov. 15, 2002), XP002462835, Retrieved from the Internet: URL:ftp://ftp.research.microsoftcom/pub/tr/tr-2002-114.pdf [retrieved on Dec. 17, 2007].
Patrick Baudisch et al: "Collapse-to-zoom Viewing Web Pages on Small Screen Devices by Interactively Removing Irrelevant Content", UIST 04. Proceedings of the 17th. Annual ACM Symposium on User Interface Software and Technology. Santa Fe, NM, Oct. 24-27, 2004; [ACM Symposium on User Interface Software and Technology. New York, NY : ACM Press, US, Oct. 24, 2004 (Oct. 24, 2004), pp. 1-4, XP002462837. ISBN: 978-1-58113-957-0.
PCT International Preliminary Report on Patentability Issued in PCT Application No. PCT/US2015/022894, dated Jun. 16, 2016, 15 Pages.
PCT International Search Report and Written Opinion for Application PCT/US2016/014201, dated Apr. 26, 2016, 12 pages.
PCT Second Written Opinion Issued in PCT Application No. PCT/US2015/022894, dated Feb. 17, 2016, 6 Pages.
Sacco, Al, "BlackBerry Passport Productivity Tips, Tricks and Keyboard Shortcuts", Published on: Oct. 8, 2014 Available at: http://www.cio.com/article/2691208/blackberry-phone/blackberry-passport-productivity-tips-tricks-and-keyboard-shortcuts.html.
Samsung note 1 Internet Snapshots taken from Samsung note 1 Internet Platform: Android, Published on: Feb. 14, 2014 Available at: http://allaboutgalaxynote.com/wp-content/uploads/2013/09/Galaxy_Note_User_Manual_GT-N7000JellybeanEUEnglish 20130124.pdf.
Yadav, at el., "Android OS Exploits: The Robust", In International Journal of Innovative Research in Technology, vol. 1, Issue 6, Nov. 2014, pp. 1537-1543.
U.S. Appl. No. 14/755,590, Office Action dated May 15, 2017, 56 pages.
U.S. Appl. No. 14/755,794, Office Action dated Jul. 17, 2017, 23 pages.
PCT Second Written Opinion Issued in PCT Application No. PCT/US2016/014201, dated Dec. 14, 2016, 4 Pages.
PCT International Preliminary report Issued in PCT Application No. PCT/US2016/014201, dated Mar. 14, 2017, 7 Pages.
U.S. Appl. No. 14/755,590, Office Action dated Dec. 1, 2017, 63 pages.
U.S. Appl. No. 14/755,794, Office Action dated Jan. 2, 2018, 24 pages.
"Non Final Office Action Issued in U.S. Appl. No. 14/755,794", dated May 21, 2018, 26 Pages.
"Office Action Issued in European Patent Application No. 16705355.2", dated Jun. 28, 2018, 4 Pages.
"Notice of Allowance Issued in U.S. Appl. No. 14/755,590", dated May 2, 2018, 19 pages.
"Notice of Allowance Issued in U.S. Appl. No. 14/755,794" dated Oct. 19, 2018, 17 Pages.
"Office Action and Search Report Issued in Russian Patent Application No. 2016138572", dated Oct. 31, 2018, 6 Pages. (W/o English Translation).
"First Office Action and Search Report Issued in Chinese Patent Application No. 201580018658.8", dated Jan. 25, 2019, 17 Pages.
"Office Action Issued in Japanese Patent Application No. 2016-559345", dated Nov. 22, 2018, 6 Pages.

* cited by examiner

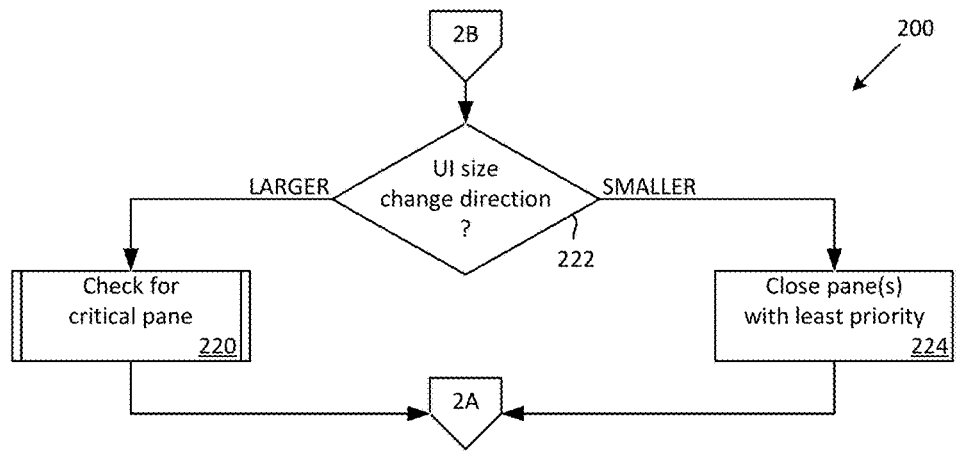
Fig. 2B
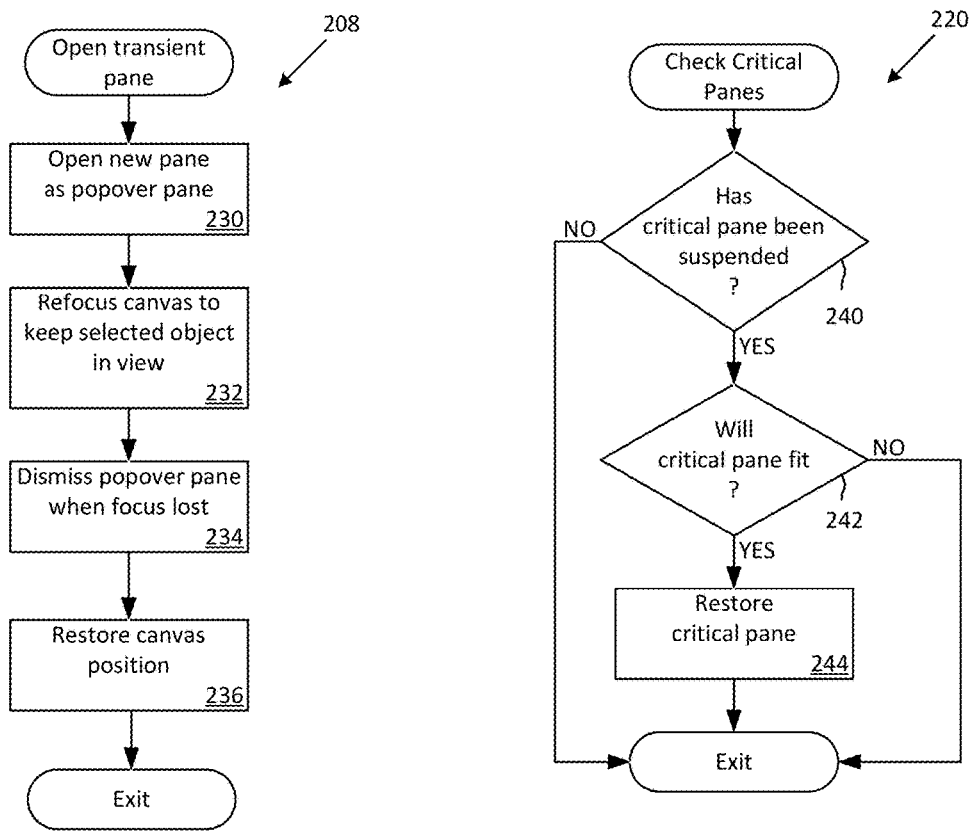
Fig. 2C
Fig. 2D

ADAPTIVE USER INTERFACE PANE MANAGER

CROSS-REFERENCE TO RELATED APPLICATIONS

This application claims priority to U.S. Provisional Patent Application No. 61/974,377, titled "Adaptive User Interface Pane Manager" filed Apr. 2, 2014, the disclosure of which is hereby incorporated by reference in its entirety.

BACKGROUND

Many user interfaces employ panes to expose application functionality and information to users. Panes are often dedicated to a specific feature or function of the application. When a user performs a task utilizing a feature or function supported by a pane, the pane is added to the user interface. In the user interface, the panes must share space with the application canvas, which holds the primary application content. While useful, panes reduce the amount of space available for the application canvas.

Without restrictions, panes can dominate the user interface, leaving little to no room for the application canvas. One conventional approach to pane management is to have no management and leaving users with the responsibility of pane management. Panes are simply opened and remain until manually closed by the user. The user may also selectively resize the open panes; however, low resolution or small form factor devices and touch-based interfaces are often incapable of providing the precise input response needed to keep the panes at usable sizes and maximum screen usage. Even when the precision is available, the effort of managing the panes detracts from the user experience.

Another conventional approach to pane management has been to place hard-coded restrictions on the number of panes. Hard-coded restrictions are not appropriate in all situations and do not take factors such as display configuration into account. When ample display area is available, the hard-coded number may unnecessarily limit a user from having access to the full number of panes that the user desires. On the other hand, when limited display area is available, the practical limit on the number of panes may be lower than the hard-coded number.

It is with respect to these and other considerations that the present disclosure has been made. Although relatively specific problems have been discussed, it should be understood that the embodiments disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Aspects of a system for automatically managing panes in relation to the application canvas in a user interface include a computing device having at least a processing device, a memory, and a display. The system determines when an event that may affect the canvas size occurs, such as changing the display configuration, resizing the application window, or reorienting the display, which in turn may affect pane management, or the opening or closing of a pane. When such an event occurs, the system collects information, which may include, but is not limited to, the protected canvas size and the current application user interface size.

When opening of a pane that is not currently open is requested, the system determines if the new pane may be added while preserving the protected canvas size. If the new pane will fit in the available space, the system opens the new pane as a persistent pane. If the new pane will not fit, the system determines if any persistent panes are currently open. If no persistent panes are open, the system opens the new pane as a transient pane rather than a persistent pane. If more than one persistent pane is open, the system closes the lowest priority persistent pane. If only one persistent pane is open and the open pane is non-critical, the system replaces the persistent pane with the new pane. If the only open pane is a critical pane, the system may temporarily close (i.e., suspend) the critical pane. Once the space is made available for the new pane by closing an open non-critical pane or suspending a critical pane, the system opens the new pane as a persistent pane.

When closing of a currently open pane is requested or the UI size increased, the system attempts to restore a pane that was automatically closed if sufficient space is available for the restored pane. If the UI size is decreased to point where the canvas size is less than the protected canvas size, the system closes panes with the lowest priority until the protected canvas size is reached or all panes have been closed. After managing the panes, the system resizes the canvas and reflows and/or zooms the content as appropriate.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views:

FIGS. 2A and 2B form a high level flowchart of one embodiment of a method of automatically managing panes in relation to the application canvas in a user interface;

FIG. 2C illustrates a high-level flowchart detailing of one embodiment of the open transient pane operation;

FIG. 2D illustrates a high-level flowchart detailing of one embodiment of the critical pane suspension check operation;

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems, or devices. Accordingly, embodiments may take the form of a hardware implementation, an entirely software implementation or an implementation combining software and hardware aspects. The following detailed description is, therefore, not to be taken in a limiting sense.

Embodiments of a system for automatically managing panes in relation to the application canvas in a user interface are described herein and illustrated in the accompanying figures. The system includes a pane manager that works in conjunction with applications to provide access to panes while keeping at least a minimum amount of user content visible. The system allows an application to define a protected canvas size. When a pane is needed, the system determines if sufficient room for the pane exists or can be created by dismissing another pane. If so, the pane is added. If not, the pane may be displayed in a temporary manner. The system also responds to changes in the user interface size. If the user interface size decreases to a point where sufficient room for existing panes is no longer available, one or more of the existing panes are dismissed.

Embodiments of the disclosure are described in terms of a traditional user interface layout merely to provide a standard frame of reference; however, the disclosure is not limited to traditional user interface layouts. As such, usage of a particular orientation (e.g., horizontal, vertical, landscape, portrait, etc.), direction (e.g., left, right, up down), position (e.g., top, bottom, side, above, below, front, back, etc.), and dimension (e.g., height, width, etc.) should not be construed as limiting to that particular orientation, direction, position, or dimension.

Figure 1:
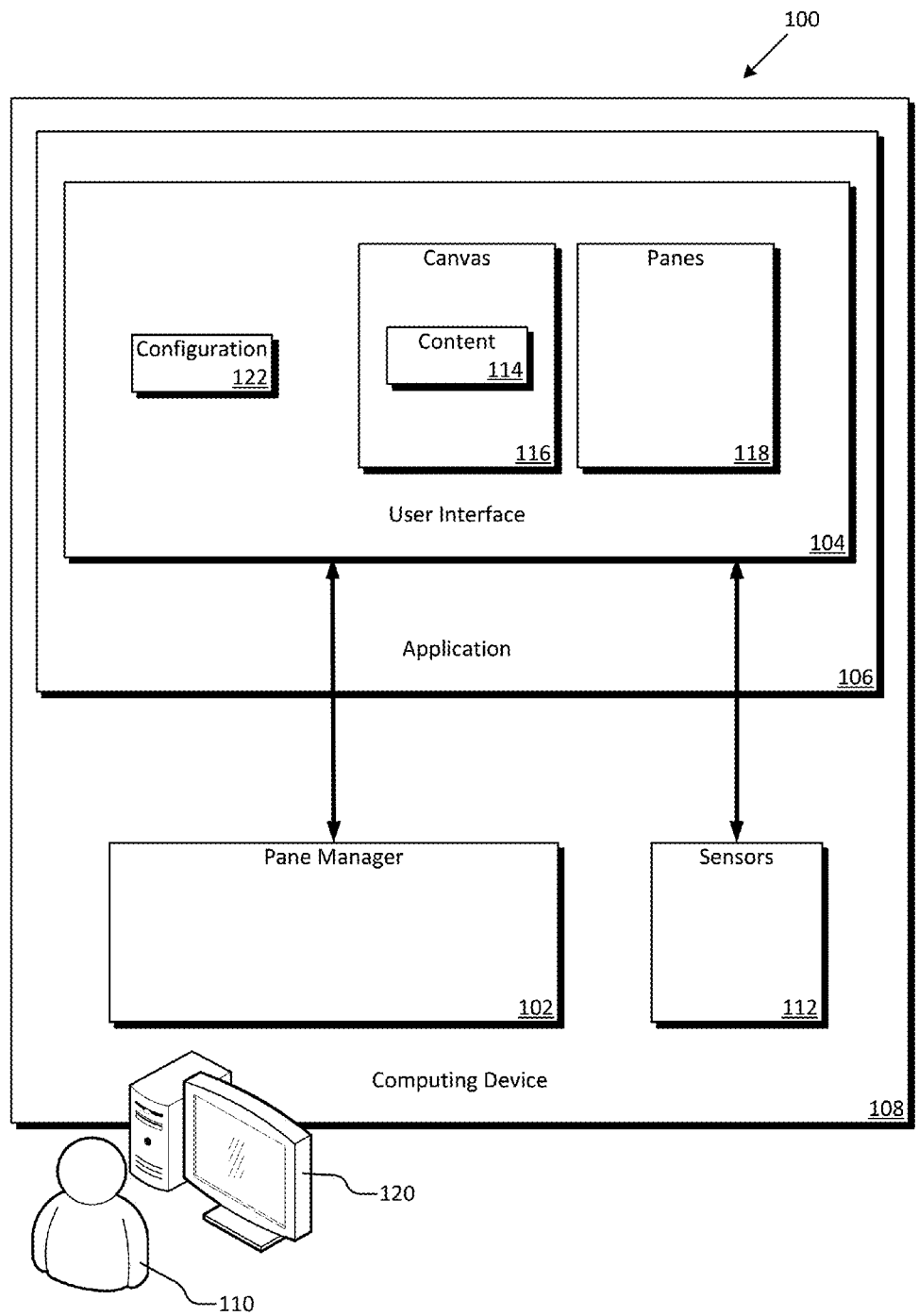
FIG. 1 is a block diagram illustrating a system for automatically managing panes in relation to the application canvas in a user interface of an application.

FIG. 1 is a block diagram illustrating a system for automatically managing panes in the user interface of an application. The system 100 includes a pane manager 102 to manage the display of panes in a user interface 104 of an application 106 based on the display properties of the device being used and the current user interface properties (e.g., canvas size, number of panes open, etc.). The pane manager 102, user interface 104, an application 106 are executed on a computing device 108. The computing device may be one of various types of computing devices (e.g., a tablet computing device, a desktop computer, a mobile communication device, a laptop computer, a laptop/tablet hybrid computing device, a large screen multi-touch display, a gaming device, a smart television, or other types of computing devices) for executing applications for performing a variety of tasks.

A user 110 may utilize the application on a computing device for a variety of tasks, which may include, for example, to write, calculate, draw, organize, prepare presentations, send and receive electronic mail, take and organize notes, make music, and the like. Applications may include thick client applications, which may be stored locally on the computing device, or may include thin client applications (i.e., web applications) that may reside on a remote server and accessible over a network, such as the Internet or an intranet. A thin client application may be hosted in a browser-controlled environment or coded in a browser-supported language and reliant on a common web browser to render the application executable on a computing device. The computing device may be configured to receive content for presentation on a display 120 (which may comprise a touch screen display).

The application may be configured to enable a user 110 to use a pointing device (e.g., a mouse, pen/stylus, etc.) and/or to utilize sensors 112 (e.g., touch sensor, accelerometer, hover, facial recognition, voice recognition, light sensor, proximity sensor, gyroscope, tilt sensor, GPS, etc.) on the computing device 110 to interact with content 114 via a number of input modes. The content may be displayed on the application canvas 116. The user interface may include one or more selectively displayable panes 118 that contain a plurality of selectable functionality controls and elements. The pane manager automatically controls the display of the panes based on a configuration 122 provided by the application to preserve a minimum amount of space on the display for the application canvas.

Figure 2A:
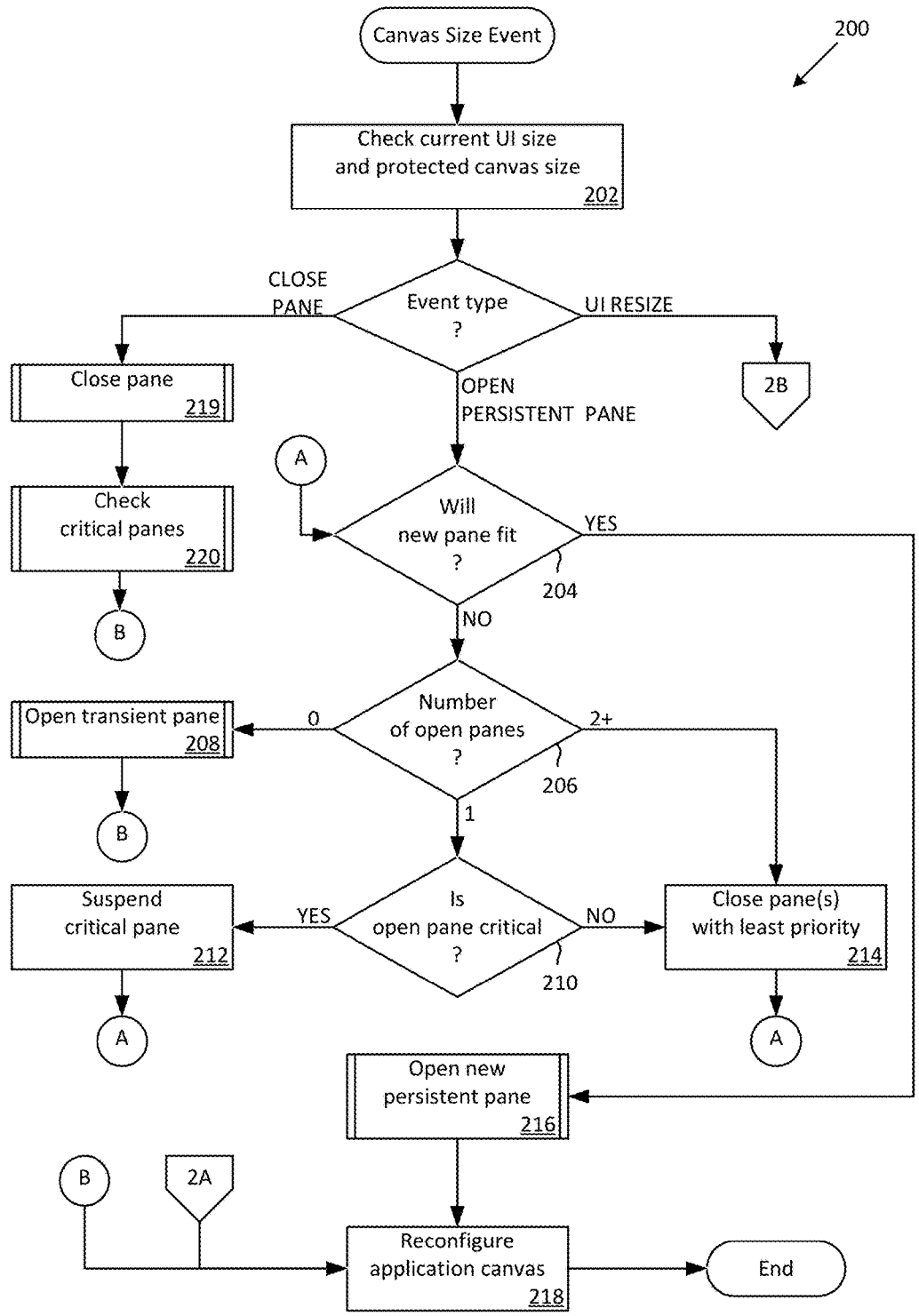

FIGS. 2A and 2B form a high level flowchart of one embodiment of a method of automatically managing panes in relation to the application canvas in a user interface. The method 200 begins when an event that may affect the canvas size occurs, such as a change in the display configuration (e.g., resolution or orientation) of the device (e.g., caused by changing the display settings or reorienting the display) or altering the user interface (e.g., resizing the application window or opening/closing a pane), which in turn may affect pane management. When such an event occurs, a current size check operation 202 collects information, which may include, but is not limited to, the protected canvas size and the current application user interface size (i.e., window). The protected canvas size specifies an application-specific minimum canvas size to ensure that a meaningful amount of user content remains visible. In other words, the size of the canvas cannot be reduced below the protected canvas size. In various embodiments, the protected canvas size may be specified in a single dimension (e.g., width or height). For example, a protected canvas width may be specified to protect against encroachment by side panes or a protected canvas width height may be specified to protect against encroachment by top/bottom panes. In other embodiments, the protected canvas size may be specified in two dimensions (e.g., width and height).

The method continues with a response that depends, at least in part, upon the type of event that occurs. If opening of a pane that is not currently open is requested (i.e., a new pane), a fit check operation 204 determines if the new pane may be added while preserving the protected canvas size. The fit check operation may take into account various properties of the requested pane, such as, but not limited to, alignment, entry behavior, title, chrome, critical, height, dock state, and width. Entry behavior specifies whether a pane is intended to be persistent or transient. Persistent (i.e., sticky) panes are intended to coexist with the canvas and may be docked in the user interface. A persistent pane remains until manually dismissed by the user (e.g., using the close widget) or programmatically closed by the application. Transient panes exist above the canvas. A transient (i.e., light dismiss or popover) pane remains until the user moves the focus to an area outside of the pane. Parameters such as entry behavior, priority, and width may directly influence treatment of the pane by the pane manager.

If the new pane will fit in the available space, an open persistent pane operation 216 opens the new pane as a persistent pane. The position of the new pane may be inward of the last opened pane or, if no other panes are open, from one side of the application user interface, or to the outside of the open panes. For example, a pane may be opened to the left of the existing panes. A canvas reconfiguration operation 218 resizes the canvas and reflows and/or zooms the content as appropriate.

If the new pane will not fit (i.e., the new canvas size would be less than the protected canvas size), a pane inventory operation 206 determines if any persistent panes are currently open. If no persistent panes are open, an open transient pane operation 208 opens the pane as a popover pane rather than a persistent pane. If more than one persistent pane is open, a close persistent pane operation 214 closes the persistent pane with the lowest priority. The selection of the pane with lowest priority may be based on criteria such as, but not limited to, primacy (i.e., the oldest open pane is closed), recency (i.e., the last pane to be opened is closed), and non-criticality (i.e., a non-critical pane is closed before closing a critical pane).

If only one persistent pane is open, a criticality determination 210 is made. If the open pane is non-critical, the method proceeds to the close persistent pane operation 214. If the only open pane is critical, a critical pane suspension operation 212 may temporarily close the critical pane. In various embodiments, the critical pane suspension operation may flag that a critical pane has been closed. The critical pane may actually be closed or may simply be hidden from view.

After panes have been closed or suspended through the critical pane suspension operation 212 or the close persistent pane operation 214, operation may return to the fit check operation 204 to re-evaluate the available space. If sufficient space is available, the method continues with the open persistent pane operation 216 and the canvas reconfiguration operation 218, if necessary. If not, operations 206 to 214 may be repeated or explored based on the current pane state.

Returning to the event type decision, if a close pane event occurs, a close pane operation 219 closes the pane freeing up space in the UI area. A critical pane suspension check operation 220 attempts to restore a critical pane that has been previously suspended, provided that sufficient space for the critical pane is available. The method continues with the canvas reconfiguration operation 218, if necessary.

Returning to the event type decision, if a UI size change event occurs, the method continues (FIG. 2B) with a UI size change direction determination 222. A UI size change may occur independently of opening or closing a pane. A UI size change event may be caused by directly resizing the UI area (i.e., window) or a component of the UI (e.g., the application canvas or panes) or by reconfiguration of the display (e.g., changing the resolution or orientation of the display). If the UI size has increased, meaning more space is potentially available for the canvas and panes, the critical pane suspension check operation 220 attempts to restore a critical pane that has been previously suspended, provided that sufficient space for the critical pane is available. If the UI size has decreased, an ensure protected canvas size operation 224 determines whether the resulting canvas size is less than the protected canvas size and closes panes with the lowest priority until the protected canvas size is reached or all panes have been closed. Instead of closing the low-priority panes, the ensure protected canvas size operation 224 may selectively convert one or more of the low priority persistent panes into transient panes to create space. Conversion of currently opened persistent panes to transient panes may be limited to only those panes that would have been originally opened as transient panes if sufficient space had not been available when that pane was opened. The method continues with the canvas reconfiguration operation 218 (FIG. 2A), if necessary.

FIG. 2C illustrates a high-level flowchart detailing of one embodiment of the open transient pane operation. The open transient operation 208 begins with an open popover pane operation 230 that opens the new pane as a transient pane covering a portion of the canvas. An optional focusing operation 232 may provide any special handling of the canvas, document, and/or user interface when a transient pane is displayed. Depending upon the application, the focusing operation may manipulate the canvas or document to keep the selected object in view in the portion of the canvas not covered by the transient pane. For example, in a word processing or a spreadsheet application, the focusing operation may scroll the canvas to keep the selected object in view. Similarly, in a presentation application, the focusing operation may scale the document to keep the selected object in view. In the case of a more modular application, such as a combination email, calendaring, and task application, the focusing operation may optionally change the shape and/or configuration the application user interface to make the best use of the remaining available space. An automatic dismissal operation 234 dismisses the transient pane once the transient pane loses focus. An optional canvas restore operation 236 may undo any special handling performed by the pan operation. For example, the canvas restore operation may scroll the canvas back to its original position.

FIG. 2D illustrates a high-level flowchart detailing of one embodiment of the critical pane suspension check operation. The critical pane suspension check operation 220 begins with suspended critical pane identification operation 240 that determines if a panel designated as critical by the application is not currently open. If a critical pane is closed, a fit check determination 242 determines if there is sufficient space to open the critical pane. If so, a restore critical pane operation 244 loads or unhides the critical pane, as appropriate. Although described in terms of critical panes, the critical pane suspension check operation may be used to reopen other panes (e.g., non-critical panes that have been automatically closed).

Figure 3A:
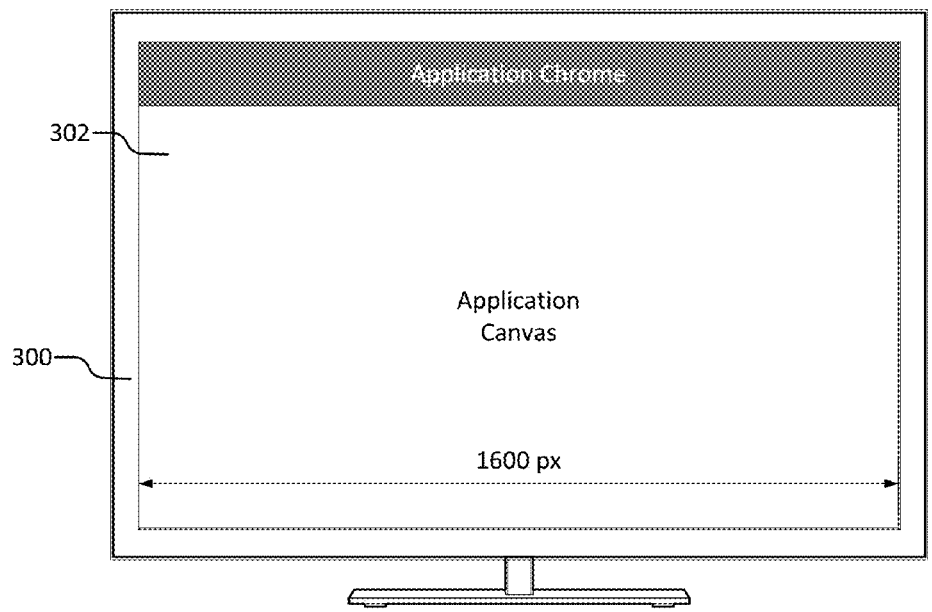
FIGS. 3A to 3E illustrate one embodiment of a pane management sequence for an application running on a higher resolution monitor in a landscape orientation.

FIGS. 3A to 3E illustrate one embodiment of a pane management sequence for an application running on a higher resolution monitor in a landscape orientation. The application defines the protected canvas size as being 400 pixels wide. In landscape orientation, the monitor 300 provides a display width of 1600 pixels. In FIG. 3A, no panes are displayed and the application canvas 302 occupies the entire width of the display.

Figure 3B:
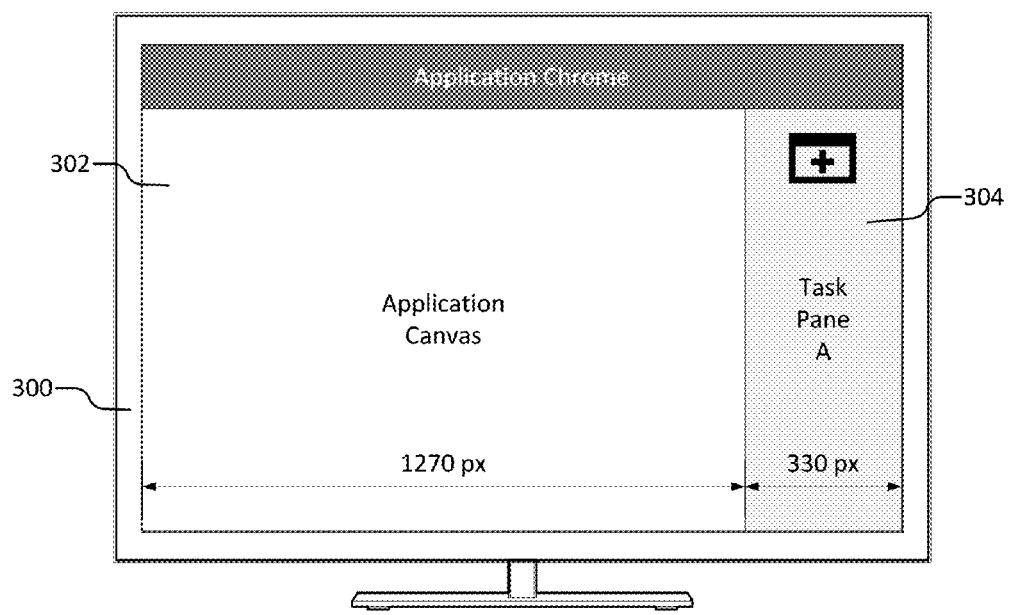

FIG. 3B shows the user interface after a first pane 304 with a width of 330 pixels has been requested. The resulting width of the canvas is 1270 pixels so the pane manager displays the first pane and resizes/reflows the canvas accordingly.

Figure 3C:
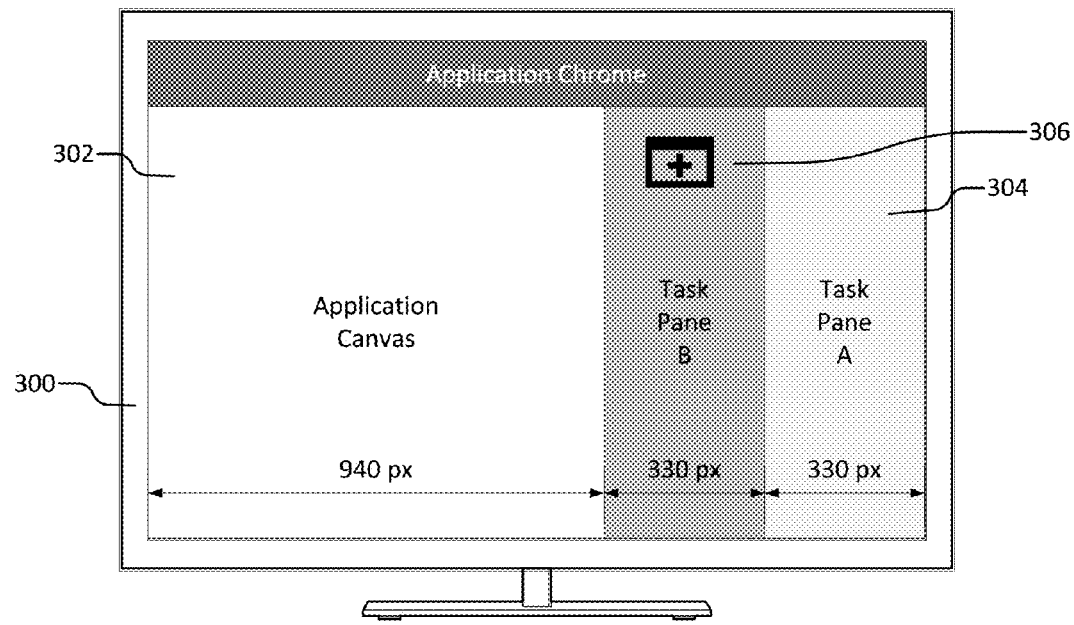

FIG. 3C shows the user interface after a second pane 306 with a width of 330 pixels has been requested. Even after adding a second pane, the resulting width of the canvas is 940 pixels, which is above the protected canvas size of 400 pixels. Accordingly, the pane manager displays the second pane to the left of the first pane and resizes/reflows the canvas accordingly.

Figure 3D:
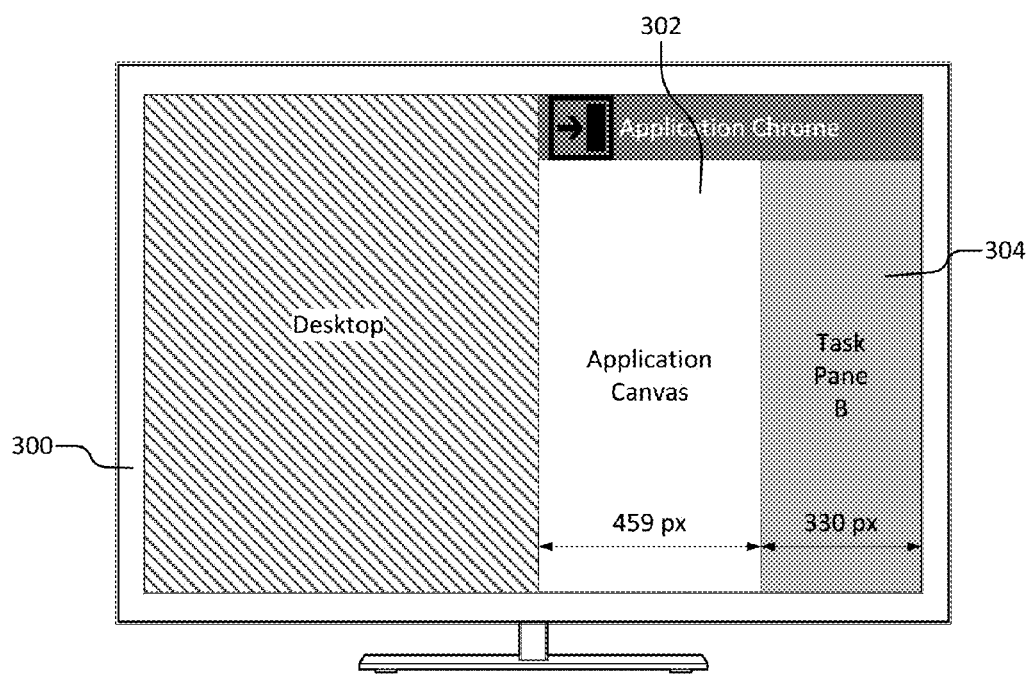

FIG. 3D shows the result of resizing the application user interface to a split screen layout which reduces the portion of the display available to the application user interface to 789 pixels. In the new configuration, the canvas size would be limited to 129 pixels if both panes were displayed. To maintain the minimum protected canvas size, the pane manager dismisses the first pane, which is the oldest pane, and retains the second pane. The canvas is resized/reflowed accordingly.

Figure 3E:
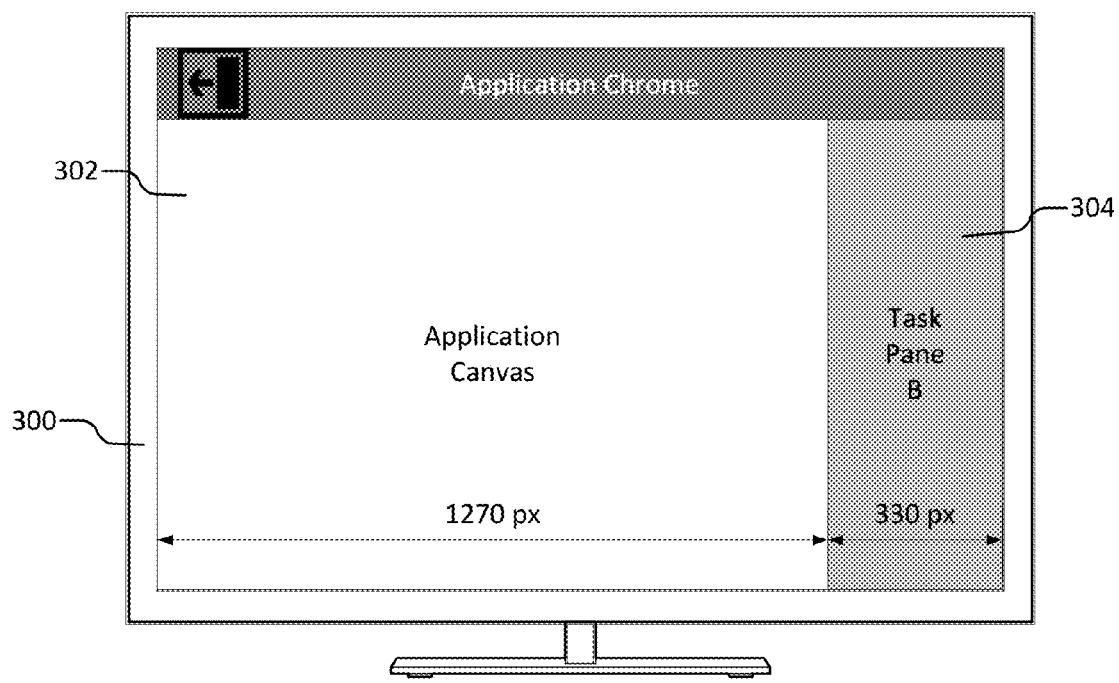

FIG. 3E shows the result of resizing the application user interface to a full screen layout which restores the portion of the display available to the application user interface to the full 1600 pixels. In the illustrated embodiment, existing panes are retained, but previously closed panes are not restored (i.e., reopened). In various embodiments, the system may attempt to restore closed panes if space is available. For example, the system may maintain a pane history and attempt to automatically reopen the most recently closed panes as space becomes available. In some embodiments, only automatically closed panes and critical panes are automatically restored. In some embodiments, only critical panes are automatically restored. The canvas is resized/reflowed accordingly.

Figure 3F:
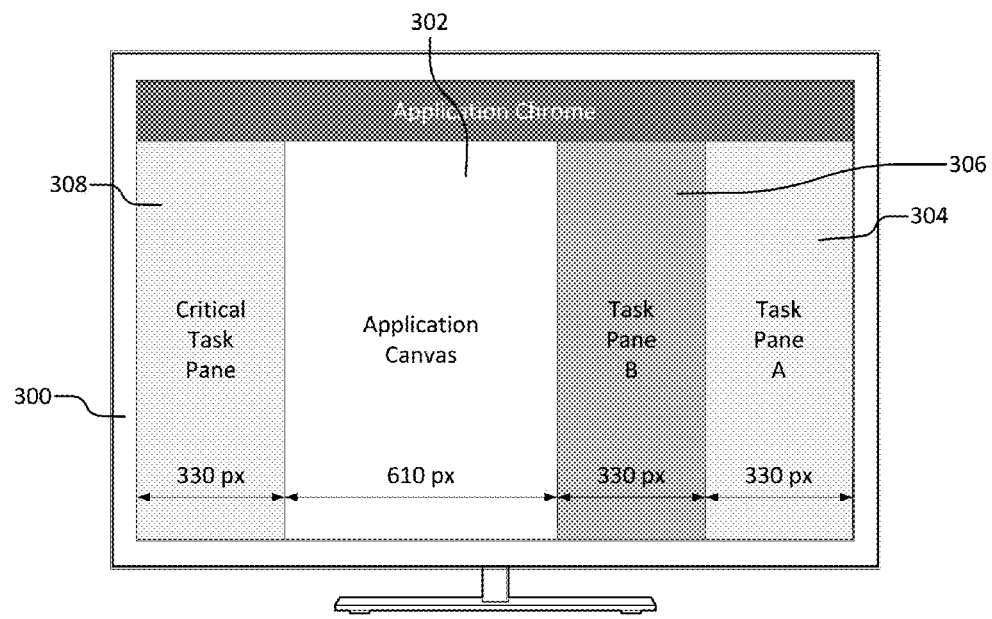
FIGS. 3F to 3I illustrate one embodiment of a pane management sequence involving a critical pane for an application running on a higher resolution monitor in a landscape orientation.

FIGS. 3F to 3I illustrate one embodiment of a pane management sequence for an application running on a higher resolution monitor in a landscape orientation involving a critical pane. FIG. 3F shows the application user interface with the application canvas 302 bounded by a critical pane 308 and two non-critical panes 304, 306. The application may define a pane as a critical pane. A critical pane may be a pane that is fundamental to the application user interface. A critical pane need not be present at all times, but should usually be available to the user. The pane manager does not automatically dismiss a critical pane unless the current user interface size only allows for a single pane to be open at a time. The pane manger will automatically restore the critical pane when the user interface size increases sufficiently or the other pane is closed. In various embodiments, the pane manager may automatically restore a critical pane even if it was manually closed. In some embodiments, the application may only designate one pane as a critical pane.

Figure 3G:
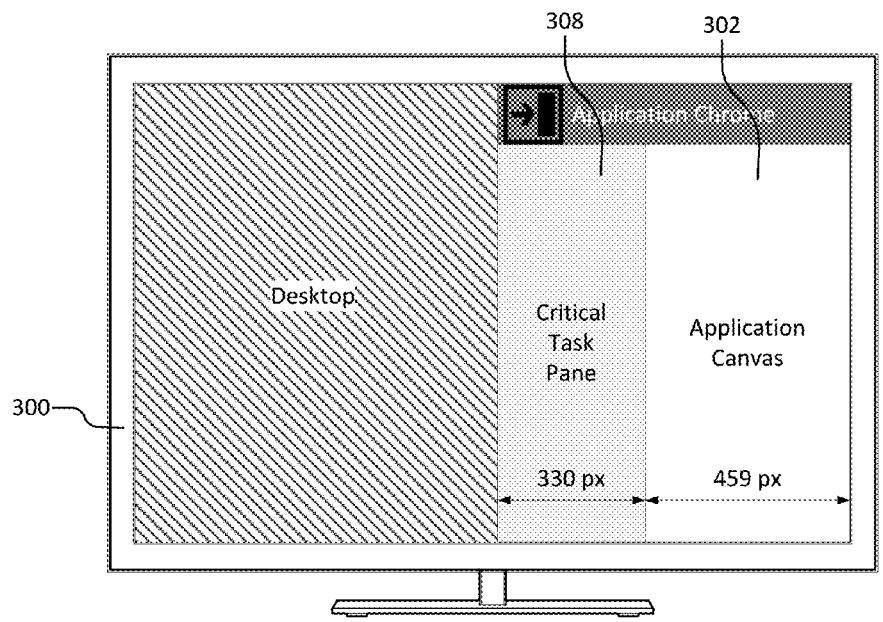

FIG. 3G shows the result of resizing the application user interface to a split screen which reduces the portion of the display available to the application user interface to 789 pixels. In the new configuration, there is only sufficient room for one pane to the canvas size above the protected canvas size. Accordingly, the pane manager dismisses both non-critical panes and retains the critical pane. The canvas is resized/reflowed accordingly.

Figure 3H:
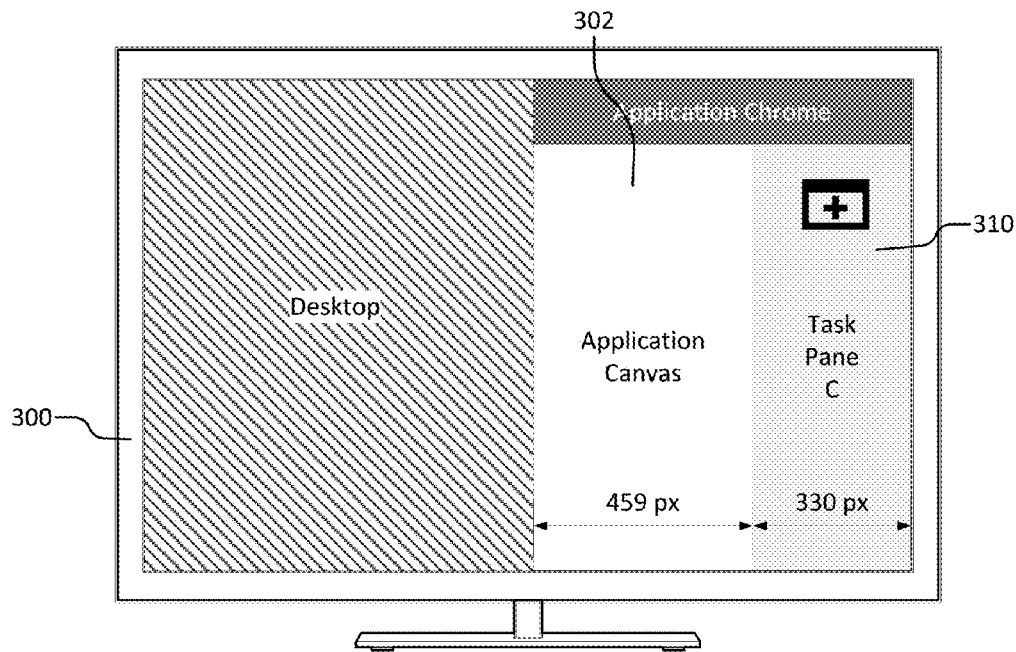

FIG. 3H shows the user interface in the split screen layout after a third pane 310 with a width of 330 pixels has been requested. Because only there is only room for one pane, critical pane is temporarily suspended in favor of the third task pane. The canvas is resized/reflowed accordingly.

Figure 3I:
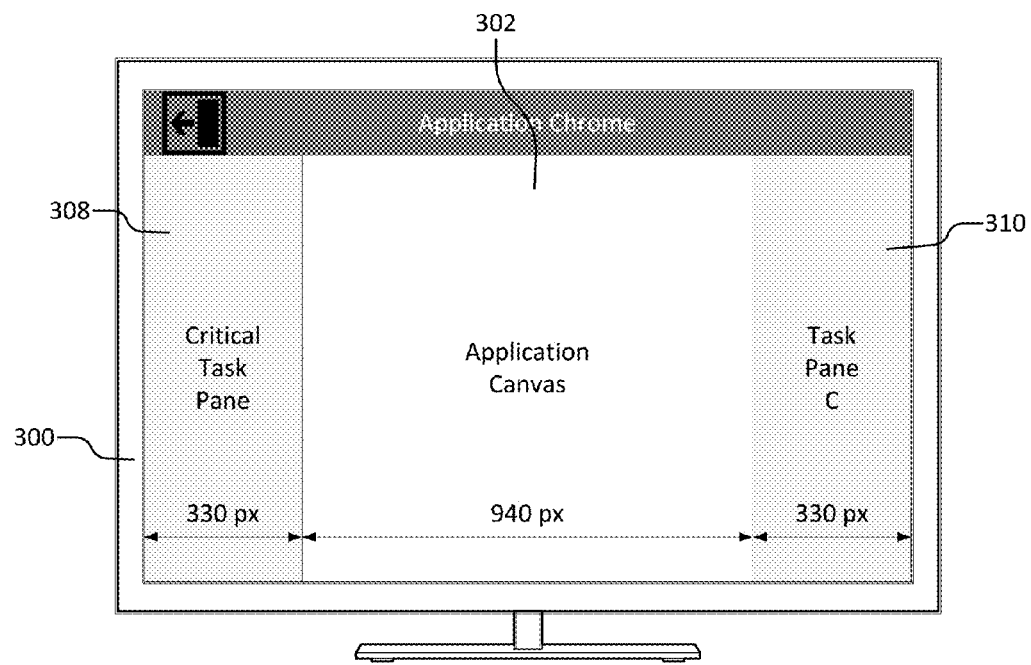

FIG. 3I shows the result of resizing the application user interface to a full screen layout which restores the portion of the display available to the application user interface to the full 1600 pixels. Existing panes are retained. In addition, because sufficient space is now available, the critical pane is restored. The canvas is resized/reflowed accordingly.

Figure 4A:
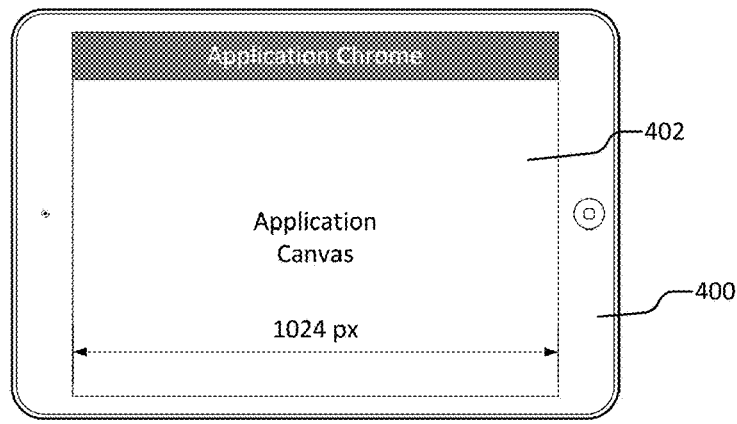
FIGS. 4A to 4G illustrate one embodiment of a pane management sequence for an application running on a lower resolution tablet.
Figure 4B:
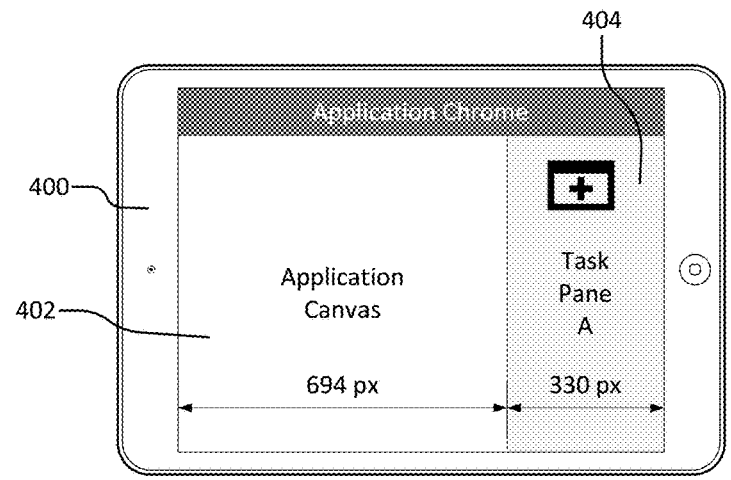
Figure 4C:
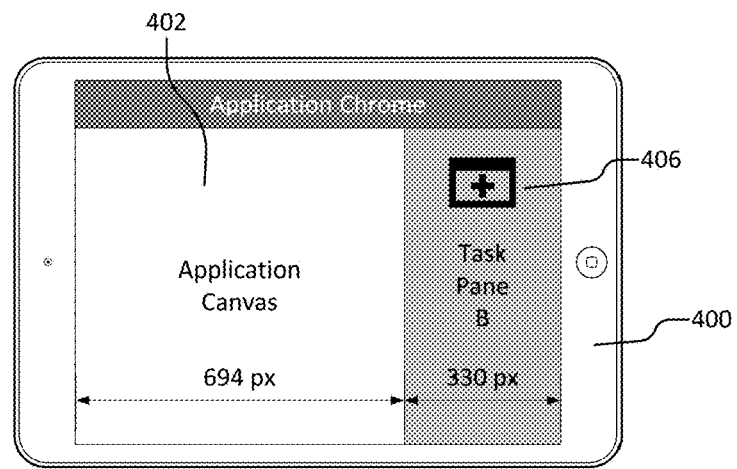

FIGS. 4A to 4C illustrate one embodiment of a pane management sequence for an application running on a lower resolution tablet. The application defines the protected canvas size as being 400 pixels wide. In landscape orientation, the tablet provides a display width of 1024 pixels. In FIG. 4A, no panes are displayed and the application canvas 402 occupies the entire width of the display.

FIG. 4B shows the user interface after a first pane 404 with a width of 330 pixels has been requested. The resulting width of the canvas is 694 pixels so the pane manager displays the first pane and resizes/reflows the canvas accordingly.

FIG. 4C shows the user interface after a second pane 406 with a width of 330 pixels has been requested. Adding a second pane would reduce the width of the canvas to 364 pixels, which is below the protected canvas size of 400 pixels. The display cannot accommodate both the first pane and second pane at the same time. Accordingly, the first pane is dismissed and the second pane is added. In effect, the second pane replaces the first pane.

Figure 4D:
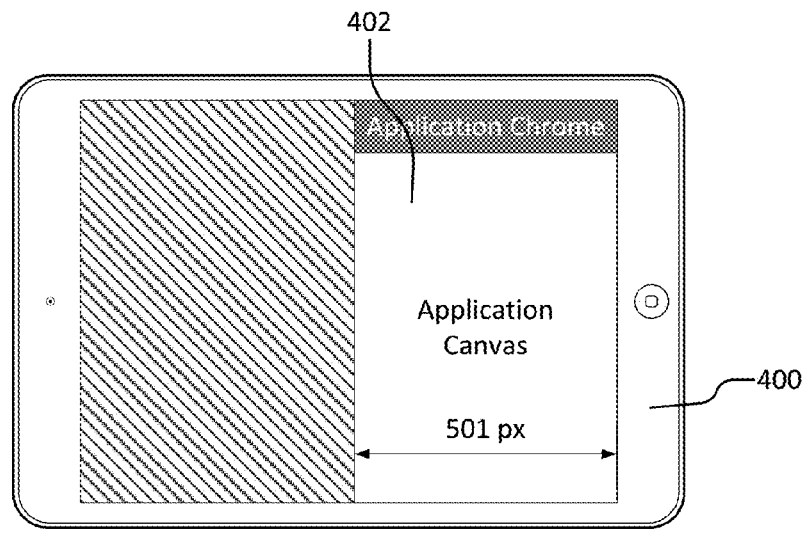

FIG. 4D shows the application user interface in a split screen layout, which reduces the portion of the display available to the application user interface to 501 pixels. In this configuration, the canvas size would be limited to 171 pixels if a pane was displayed. Accordingly, the existing pane is dismissed. The canvas is resized/reflowed accordingly.

Figure 4E:
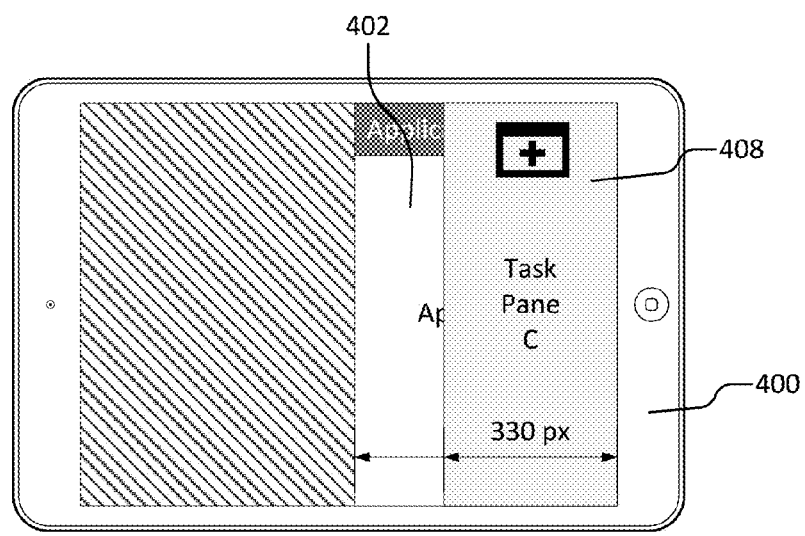

FIG. 4E shows the handling of panes when the display size and the protected application size do not allow for persistent panes. Rather than to exclude all panes for being displayed, when a pane is requested, the pane manager displays the pane as a transient pane 408. The transient pane covers at least a portion of the canvas. In the illustrated embodiment, the transient pane covers a portion of the application chrome. In other embodiments, the transient pane may not cover the application chrome. Transient panes may also appear as full screen panes or near-immersive panes, which cover a substantial portion of the total user interface area or the total display area. The application canvas is not resized/reflowed. When transient pane loses focus (i.e., the user clicks outside of the transient pane), the transient pane is dismissed, leaving the application canvas fully visible once more.

Figure 4F:
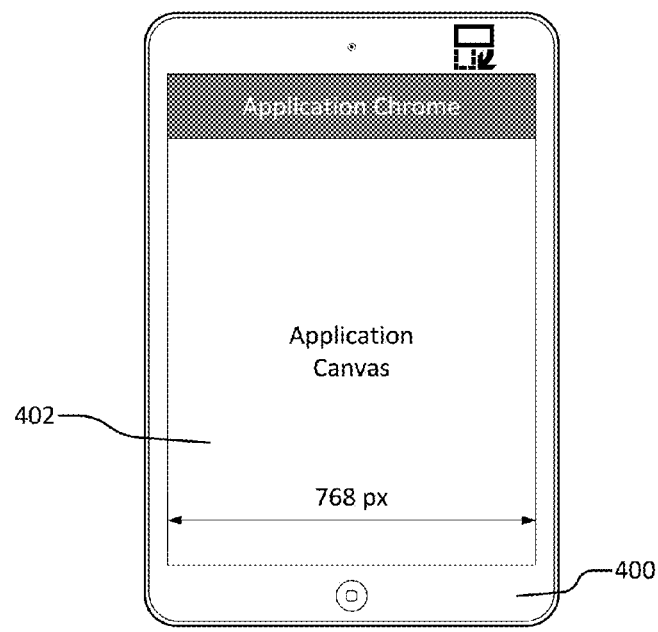
Figure 4G:
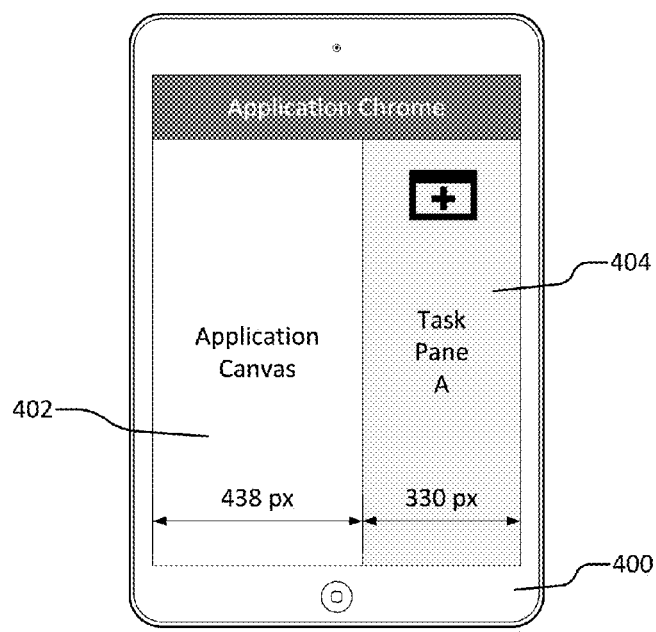

FIGS. 4F and 4G illustrate one embodiment of a pane management sequence with the tablet rotated to a portrait orientation. In portrait orientation, the tablet provides a display width of 768 pixels. In FIG. 4F, no panes are displayed and the application canvas occupies the entire width of the display.

FIG. 4G shows the user interface after the first pane 404 with a width of 330 pixels has been requested. The resulting width of the canvas is 438 pixels so the pane manager displays the first pane and resizes/reflows the canvas accordingly.

The subject matter of this application may be practiced in a variety of embodiments as systems, devices, and other articles of manufacture or as methods. Embodiments may be implemented as hardware, software, computer readable media, or a combination thereof. The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
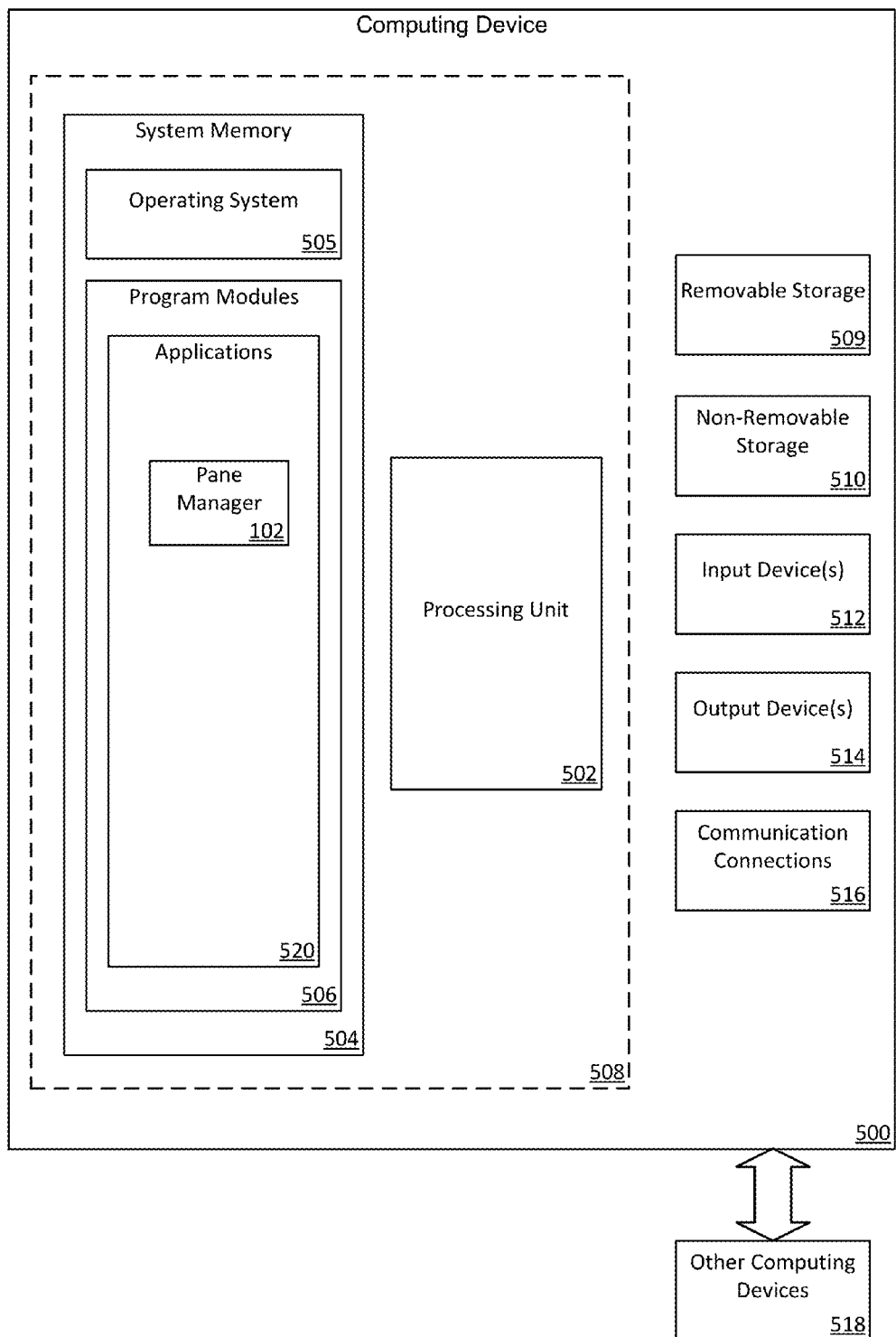
FIG. 5 is a block diagram illustrating one embodiment of the physical components of a computing device with which embodiments of the present disclosure may be practiced.
Figure 6A:
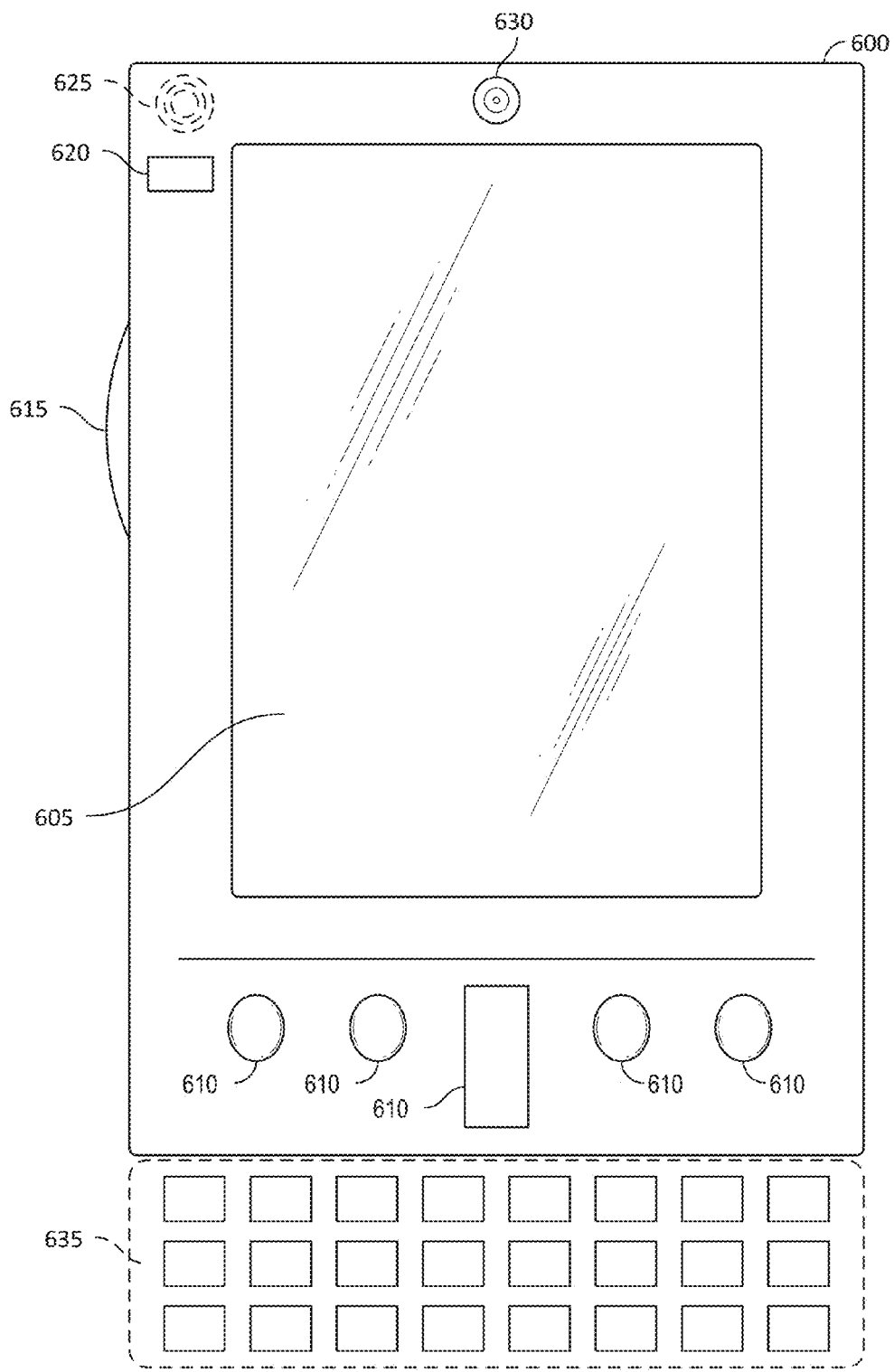
FIGS. 6A and 6B are simplified block diagrams of a mobile computing device with which embodiments of the present disclosure may be practiced.
Figure 6B:
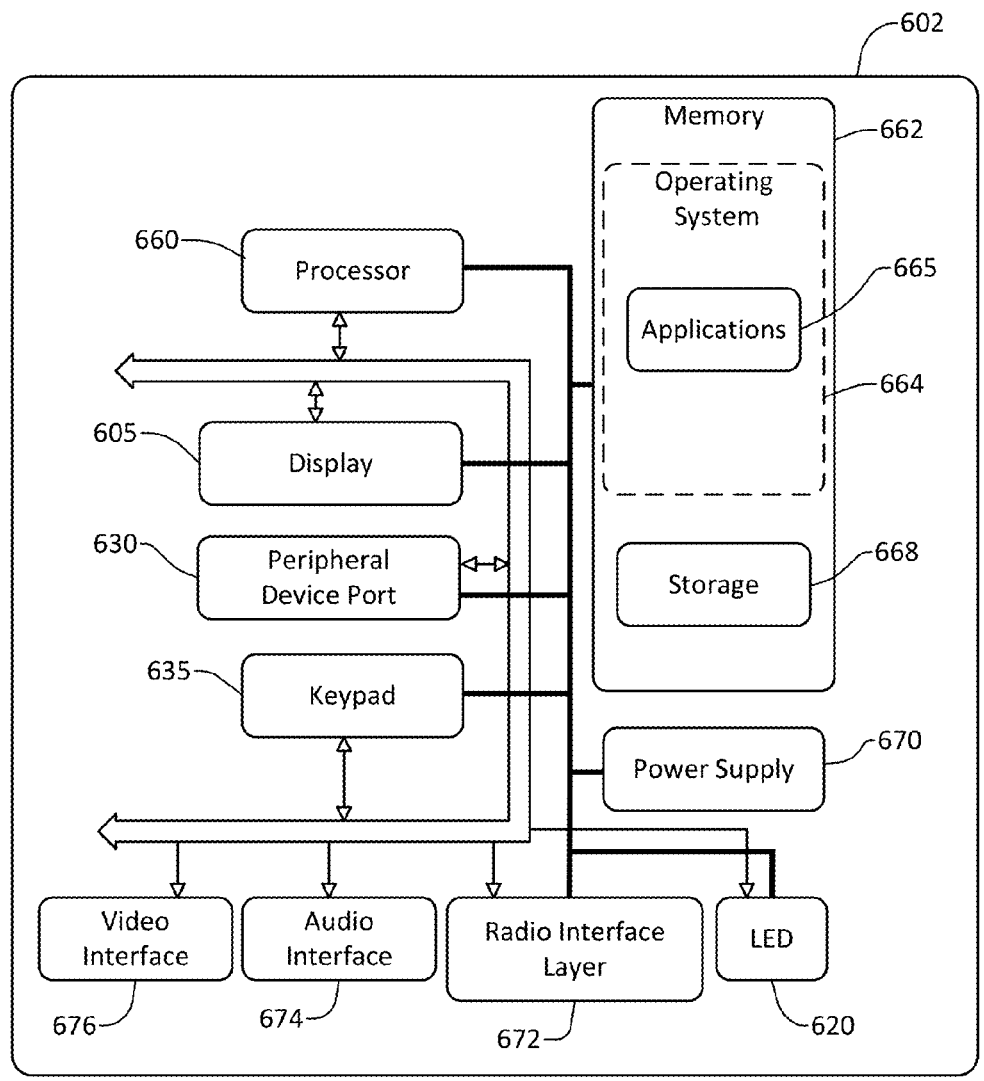
Figure 7:
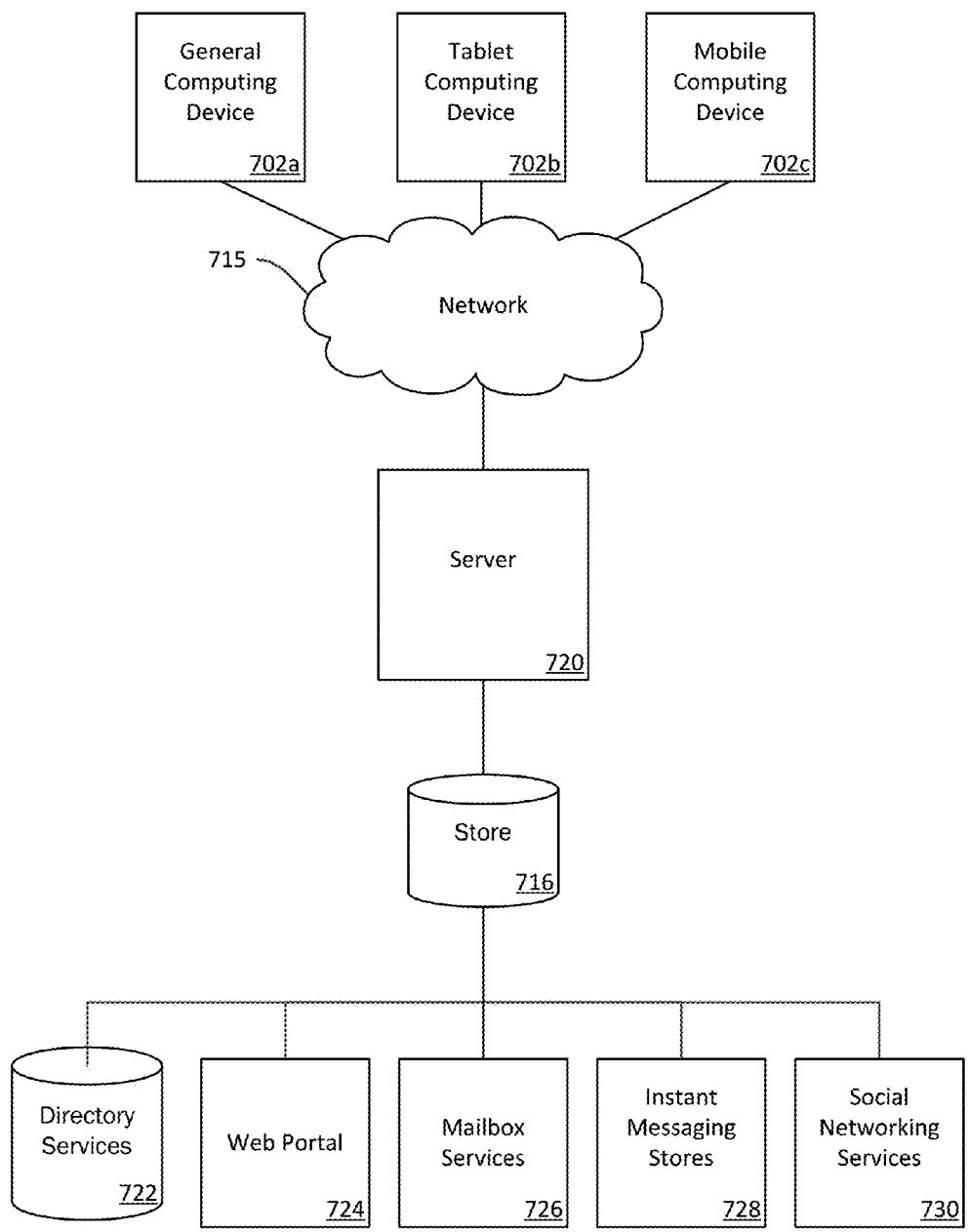
FIG. 7 is a simplified block diagram of a distributed computing system in which embodiments of the present disclosure may be practiced.

FIGS. 5 through 7 and the associated descriptions provide a discussion of a variety of operating environments in which embodiments of the disclosure may be practiced. However, the devices and systems illustrated and discussed are for purposes of example and illustration and are not limiting of a vast number of computing device configurations that may be utilized for practicing embodiments of the disclosure described above.

FIG. 5 is a block diagram illustrating physical components (i.e., hardware) of a computing device 500 with which embodiments of the disclosure may be practiced. The computing device components described below may be suitable for embodying computing devices including, but not limited to, a personal computer, a tablet computer, a surface computer, and a smart phone, or any other computing device discussed herein. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 520 such as the pane manager 102. For example, the operating system 505 may be suitable for controlling the operation of the computing device 500. Furthermore, embodiments of the disclosure may be practiced in conjunction with a graphics library, other operating systems, or any other application program and is not limited to any particular application or system. This basic configuration is illustrated by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated by a removable storage device 509 and a non-removable storage device 510.

As stated above, a number of program modules and data files may be stored in the system memory 504. While executing on the processing unit 502, the software applications 520 may perform processes including, but not limited to, one or more of the stages of the method 200. Other program modules that may be used in accordance with embodiments of the present disclosure may include electronic mail and contacts applications, word processing applications, spreadsheet applications, database applications, slide presentation applications, or computer-aided drawing application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the illustrated components may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein with respect to the software applications 520 may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound input device, a touch input device, etc. The output device(s) 514 such as a display, a projector, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all examples of computer storage media (i.e., memory storage). Computer storage media may include random access memory (RAM), read only memory (ROM), electrically erasable programmable read-only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500.

FIGS. 6A and 6B illustrate a mobile computing device 600 with which embodiments of the disclosure may be practiced. Examples of suitable mobile computing devices include, but are not limited to, a mobile telephone, a smart phone, a tablet computer, a surface computer, and a laptop computer. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative embodiments, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface, a visual indicator 620 (e.g., a light emitting diode), and/or an audio transducer 625 (e.g., a speaker). In some embodiments, the mobile computing device 600 incorporates a vibration transducer for providing the user with tactile feedback. In yet another embodiment, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one embodiment of a mobile computing device. That is, the mobile computing device 600 can incorporate a system (i.e., an architecture) 602 to implement some embodiments. In one embodiment, the system 602 is implemented as a smart phone capable of running one or more applications (e.g., browsers, e-mail clients, notes, contact managers, messaging clients, games, and media clients/players). In some embodiments, the system 602 is integrated as a computing device, such as an integrated personal digital assistant (PDA) and wireless phone.

One or more application programs 665 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 665 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including software applications 520 described herein.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the outside world via a communications carrier or service provider. Transmissions to and from the radio 672 are conducted under control of the operating system 664. In other words, communications received by the radio 672 may be disseminated to the application programs 665 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one embodiment of the architecture of a system for providing multi-voice font interpolation functionality to one or more client devices, as described above. Content developed, interacted with, or edited in association with the software applications 520 may be stored in different communication channels or other storage types. For example, various documents may be stored using a directory service 722, a web portal 724, a mailbox service 726, an instant messaging store 728, or a social networking site 730. The software applications 520 may use any of these types of systems or the like for enabling data utilization, as described herein. A server 720 may provide the software applications 520 to clients. As one example, the server 720 may be a web server providing the software applications 520 over the web. The server 720 may provide the software applications 520 over the web to clients through a network 715. By way of example, the client computing device may be implemented as the computing device 500 and embodied in a personal computer 702a, a tablet computer 702b, and/or a mobile computing device (e.g., a smart phone) 702*c*. Any of these embodiments of the client device may obtain content from the store 716.

The description and illustration of one or more embodiments provided in this application are intended to provide a complete thorough and complete disclosure the full scope of the subject matter to those skilled in the art and not intended to limit or restrict the scope of the disclosure as claimed in any way. The embodiments, examples, and details provided in this application are considered sufficient to convey possession and enable those skilled in the art to practice the best mode of claimed disclosure. Descriptions of structures, resources, operations, and acts considered well-known to those skilled in the art may be brief or omitted to avoid obscuring lesser known or unique aspects of the subject matter of this application. The claimed disclosure should not be construed as being limited to any embodiment, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept embodied in this application that do not depart from the broader scope of the claimed disclosure.

What is claimed is:

1. A computer-implemented method of automatically managing panes in relation to an application canvas in a user interface having a width, the method comprising:
   receiving an indication from an application of a minimum width for the application canvas;
   receiving a request to add a selected persistent pane in the user interface of the application, wherein a persistent pane comprises a pane that is displayed along with the canvas without overlapping the canvas;
      determining that the selected persistent pane cannot be displayed while maintaining the minimum width of the canvas;
   based on the determination that the selected persistent pane cannot be displayed while maintaining the minimum width of the canvas, determining if any persistent panes are currently displayed in the user interface;
   based on a determination that two or more persistent panes are currently displayed in the user interface:
      closing a sufficient number of the two or more persistent panes, in order of least priority, that are currently displayed, so that the selected persistent pane is able to be displayed along with the canvas without overlapping the canvas while maintaining the minimum width of the canvas; and
      displaying the selected persistent pane as an opened persistent pane;
   based on a determination no persistent panes are currently displayed in the user interface:
      opening a transient pane, wherein a transient pane comprises a pane that exists above the canvas enabling overlapping the canvas; and
      displaying the selected persistent pane as the transient pane;
   based on a determination that only one persistent pane is currently displayed in the user interface:
      determining if the currently displayed persistent pane is a critical pane, wherein a criticality of the persistent pane is previously designated by the application;
      based on the determination that the currently displayed persistent pane is a non-critical pane, closing the critical pane and determining if the selected persistent pane can now be displayed along with the canvas, without overlapping the canvas, while maintaining the minimum width of the canvas; and
      based on the determination that the currently displayed persistent pane is a critical pane, temporarily closing or suspending display of the critical pane and determining if the selected persistent pane can now be displayed along with the canvas, without overlapping the canvas, while maintaining the minimum width of the canvas.

2. The method of claim 1, wherein the priority is determined based on one or more of primacy of the persistent pane, recency of the persistent pane and criticality of the persistent pane.

3. The method of claim 1, further comprising dismissing the transient pane when the transient pane loses focus.

4. The method of claim 1, wherein displaying the selected persistent pane as the opened persistent pane includes reducing the width the of the canvas to its minimum width.

5. A computer-implemented system for automatically managing application panes in relation to the application canvas in a user interface, the computer-implemented system comprising:
   a computing device comprising a processor, a minimum canvas size memory, and an output device for presenting a visual output to a user, the visual output comprising the user interface of an application, wherein the computing device is caused to:
      receive an indication from an application of a minimum width for the application canvas;
      receive a request to add a selected persistent pane in the user interface of the application, wherein a persistent pane comprises a pane that is displayed along with the canvas without overlapping the canvas;
      determine that the selected persistent pane cannot be displayed while maintaining the minimum width of the canvas;
      based on the determination that the selected persistent pane cannot be displayed while maintaining the minimum width of the canvas, determine if any persistent panes are currently displayed in the user interface;
      based on a determination that two or more persistent panes are currently displayed in the user interface:
         close a sufficient number of the two or more persistent panes, in order of least priority, that are currently displayed so that the selected persistent pane is able to be displayed along with the canvas without overlapping the canvas while maintaining the minimum width of the canvas; and
         display the selected persistent pane as an opened persistent pane;
      based on a determination no persistent panes are currently displayed in the user interface:
         open a transient pane, wherein a transient pane comprises a pane that exists above the canvas enabling overlapping the canvas; and
         display the selected persistent pane as the transient pane;
      based on a determination that only one persistent pane is currently displayed in the user interface:

determine if the currently displayed persistent pane is a critical pane, wherein a criticality of the persistent pane is previously designated by the application;

based on the determination that the currently displayed persistent pane is a non-critical pane, close the critical pane and determine if the selected persistent pane can now be displayed along with the canvas, without overlapping the canvas, while maintaining the minimum width of the canvas; and based on the determination that the currently displayed persistent pane is a critical pane, temporarily close or suspend display of the critical pane and determine if the selected persistent pane can now be displayed along with the canvas, without overlapping the canvas, while maintaining the minimum width of the canvas.

6. The system of claim 5, wherein the priority is determined based on one or more of primacy of the persistent pane, recency of the persistent pane and criticality of the persistent pane.

7. The system of claim 5, wherein the computing device is further caused to dismiss the transient pane when the transient pane loses focus.

8. The system of claim 5, wherein display of the selected persistent pane as the opened persistent pane includes the reduction of the width the of the canvas to its minimum width.

9. A computer readable storage medium, implemented in hardware, containing computer executable instructions which, when executed by a computer, perform a method of automatically managing panes in relation to the application canvas in a user interface of an application, the method comprising:

receiving an indication from an application of a minimum width for the application canvas;

receiving a request to add a selected persistent pane in the user interface of the application, wherein a persistent pane comprises a pane that is displayed along with the canvas without overlapping the canvas;

determining that the selected persistent pane cannot be displayed while maintaining the minimum width of the canvas;

based on the determination that the selected persistent pane cannot be displayed while maintaining the minimum width of the canvas, determining if any persistent panes are currently displayed in the user interface;

based on a determination that two or more persistent panes are currently displayed in the user interface:
closing a sufficient number of the two or more persistent panes, in order of least priority, that are currently displayed so that the selected persistent pane is able to be displayed along with the canvas without overlapping the canvas while maintaining the minimum width of the canvas; and
displaying the selected persistent pane as an opened persistent pane;

based on a determination no persistent panes are currently displayed in the user interface:
opening a transient pane, wherein a transient pane comprises a pane that exists above the canvas enabling overlapping the canvas; and
displaying the selected persistent pane as the transient pane;

based on a determination that only one persistent pane is currently displayed in the user interface:
determining if the currently displayed persistent pane is a critical pane, wherein a criticality of the persistent pane is previously designated by the application:
based on the determination that the currently displayed persistent pane is a non-critical pane, closing the critical pane and determining if the selected persistent pane can now be displayed along with the canvas, without overlapping the canvas, while maintaining the minimum width of the canvas; and
based on the determination that the currently displayed persistent pane is a critical pane, temporarily closing or suspending display of the critical pane and determining if the selected persistent pane can now be displayed along with the canvas, without overlapping the canvas, while maintaining the minimum width of the canvas.

10. The computer-readable storage medium of claim 9, wherein the priority is determined based on one or more of primacy of the persistent pane, recency of the persistent pane and criticality of the persistent pane.

11. The computer-readable storage medium of claim 9, the method further comprising dismissing the transient pane when the transient pane loses focus.

12. The computer-readable storage medium of claim 9, wherein displaying the selected persistent pane as the opened persistent pane includes reducing the width the of the canvas to its minimum width.

\* \* \* \* \*